E. F. LUDWIG & W. H. SPENCER.
GASOLENE SETTLING TRAP FOR AUTOMOBILES.
APPLICATION FILED SEPT. 20, 1915.
1,173,725.
Patented Feb. 29, 1916.
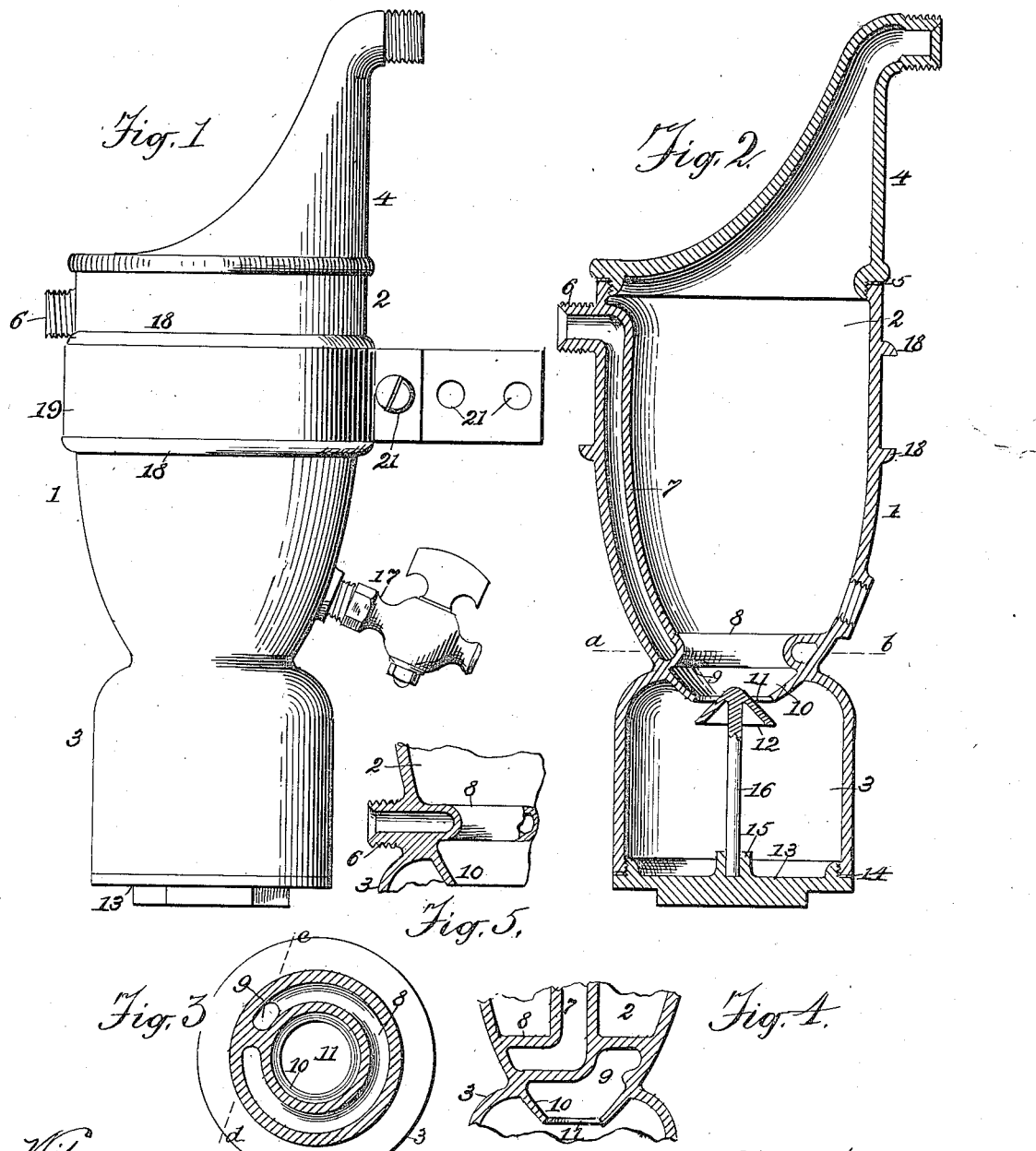

UNITED STATES PATENT OFFICE.

EDGAR F. LUDWIG AND WILLIAM H. SPENCER, OF CEDAR RAPIDS, IOWA.

GASOLENE-SETTLING TRAP FOR AUTOMOBILES.

1,173,725.   Specification of Letters Patent.   Patented Feb. 29, 1916.

Application filed September 20, 1915. Serial No. 51,667.

*To all whom it may concern:*

Be it known that we, EDGAR F. LUDWIG and WILLIAM H. SPENCER, citizens of the United States, residing at Cedar Rapids, in the county of Linn and State of Iowa, have invented certain new and useful Improvements in Gasolene-Settling Traps for Automobiles; and we do hereby declare the following to be a full, clear, and exact description of the invention, such as will enable others skilled in the art to which it appertains to make and use the same.

This invention relates to the purification of gasolene preliminary to its use in a carbureter of a gasolene engine, and more particularly those used in automobiles.

The object of the invention is to provide a settling chamber or trap, of peculiar construction, adapted to facilitate the settling of the heavier impurities in gasolene, and to supply to a carbureter the pure gasolene at the top, with provision for the convenient cleaning of the vessel itself.

In the accompanying drawing, forming a part of this specification, Figure 1 is a side view of our improved settling-trap. Fig. 2 is a central section of the same. Fig. 3 is a section of the same below the line *a b* of Fig. 2. Fig. 4 is a fragmentary section taken in the line *c d*, looking toward the left. Fig. 5 is a fragmentary section in the same plane as Fig. 2, showing a modification on the construction of the receiving chamber.

In the drawing the numeral 1 designates the receptacle as a whole, preferably approximating a pitcher in general outline, and having two compartments or chambers, an upper one, 2, and a lower one, 3, which latter constitutes the settling chamber. To the upper chamber is attached an outlet top 4, adapted to be connected by a suitable union with the carbureter or a pipe thereto, neither being shown. This top should fit tightly on the receiving chamber, as by a gasket 5. The gasolene supply tank, not shown, is supposed to be located at a higher level than any part of the settling trap, and connection is made thereto by a union at 6. In the principal figures this is shown near the top of the receiving chamber, and inside the chamber is formed a duct 7 leading from the inlet to an annular continuation of the duct 8 at the neck of the main vessel. The annular duct encircles the chamber, and has a downward discharge outlet at 9. The fluid as it enters the chamber is thus forced to take a circuitous course tending to retard its flow, and to a certain extent promote the settling of sediment (or water). Below the annular duct is a shallow, funnel-like cup 10, with a central hole 11, the form of the cup being such as to cause a vortical action of the descending fluid as it passes into the settling chamber. Before reaching such chamber, however, it strikes the mushroom-like head of a deflector 12, rising partly into the hole 11. This tends to reverse the direction of movement of the fluid, and throws it out toward the sides of the settling chamber. By reason of the vortex or whirl so obtained the incoming gasolene is carried outwardly and downwardly as it enters the trap, and only the quiet part of the fluid rises to the outlet at the upper end. Before it does so rise there has been time for the heavier impurities, which would cause trouble in the carbureter, to settle by gravity in the settling chamber. This has a removable bottom 13, which should fit tightly, as by a gasket 14. In the center of this bottom is a socket 15 for the stem 16 of the deflector, which simply rests therein. It is desirable to permit the easy removal of the deflector from the bottom, as the sediment accumulating in the settling chamber is apt to form a hard, compact mass, out of which it would be difficult or impossible to remove the deflector without preliminary digging.

The inside duct 7 is not indispensable, and in Fig. 5 we have shown provision for a direct connection of a supply-pipe with the annular duct.

Drainage of the receiving chamber is provided by means of a pet-cock 17.

Encircling the body of the main chamber is a pair of ribs 18, which serve to retain an encircling band 19 clamped to the vessel by a screw 20, and having holes 21 whereby it may be bolted to some suitable part of the machine between the supply tank and the carbureter.

Having thus described our invention, we claim:

1. A gasolene settling trap comprising a vessel with a deep upper chamber converging upwardly to an outlet, and at its lower end having an annular duct with an internal, downwardly opening outlet and a contiguous outward inlet, a funnel-like cup below said duct with a central hole therein, a lower, settling chamber with a removable bottom, and a deflector with a flaring conical head below the hole in the cup, and with a stem removably seated in the bottom.

2. A gasolene settling trap, comprising a vessel with an upper receiving chamber and a lower settling chamber separated by a constricted portion or neck, an annular duct inside said neck with an outwardly opening inlet and an inward, downwardly opening outlet, a funnel-like cup below said duct opening centrally into the lower chamber, a removable bottom for the lower chamber, a top for the upper chamber extending upwardly therefrom and converging to a narrow outlet, external ribs around the upper chamber, and a band between them adapted for attachment to a suitable support.

3. A gasolene settling trap, comprising a vessel with an upper receiving chamber and a lower settling chamber separated by a constricted portion or neck, an annular duct inside said neck with an outwardly opening inlet and an inward, downwardly opening outlet, a removable bottom for the lower chamber, a top for the upper chamber extending upwardly therefrom and converging to a narrow outlet, and means for attaching said chamber to a suitable support.

In testimony whereof we affix our signatures in presence of two witnesses.

EDGAR F. LUDWIG.
WILLIAM H. SPENCER.

Witnesses:
G. K. THOMPSON,
J. M. ST. JOHN.